United States Patent
Stoldt et al.

(10) Patent No.: US 10,502,249 B2
(45) Date of Patent: Dec. 10, 2019

(54) LINK CONNECTOR

(71) Applicant: FORUM US, INC., Houston, TX (US)

(72) Inventors: Frederik Stoldt, Hamburg (DE); Andre Vierke, Hamburg (DE); Lawrence E. Childress, II, Lafayette, LA (US)

(73) Assignee: FORUM US, INC., Houston, TX (US)

( * ) Notice: Subject to any disclaimer, the term of this patent is extended or adjusted under 35 U.S.C. 154(b) by 355 days.

(21) Appl. No.: 15/426,221

(22) Filed: Feb. 7, 2017

(65) Prior Publication Data
US 2017/0284438 A1    Oct. 5, 2017

Related U.S. Application Data

(60) Provisional application No. 62/314,559, filed on Mar. 29, 2016.

(51) Int. Cl.
| | |
|---|---|
| *F16B 45/02* | (2006.01) |
| *F16B 7/22* | (2006.01) |
| *E21B 19/02* | (2006.01) |
| *F16B 45/06* | (2006.01) |

(52) U.S. Cl.
CPC ............... *F16B 7/22* (2013.01); *E21B 19/02* (2013.01); *F16B 45/06* (2013.01)

(58) Field of Classification Search
CPC . B66C 1/36; F16B 45/00; F16B 45/02; Y10T 24/318; Y10T 24/3485; Y10T 24/3916; Y10T 24/4523; Y10T 24/45346; Y10T 24/45236; Y10T 24/45251; Y10T 24/45319; Y10T 24/44256; Y10T 24/45293; Y10T 24/45372; Y10T 24/45408; Y10T 24/45958; Y10T 24/4764; Y10T 24/4755; Y10T 24/4773; E21B 19/02; E21B 19/04; E21B 19/06
See application file for complete search history.

(56) References Cited

U.S. PATENT DOCUMENTS

| | | |
|---|---|---|
| 582,780 A | 5/1897 | Eldridge |
| 1,709,235 A | 4/1929 | Shaffer |
| (Continued) | | |

FOREIGN PATENT DOCUMENTS

FR          3002156 A1    8/2014

OTHER PUBLICATIONS

"Center of Gravity—CG." Edited by Nancy Hall, NASA, May 5, 2015, www.grc.nasa.gov/www/k-12/airplane/cg.html. Accessed: Mar. 20, 2019. (Year: 2015).*

(Continued)

*Primary Examiner* — Daniel J Wiley
(74) *Attorney, Agent, or Firm* — Patterson & Sheridan, L.L.P.

(57) ABSTRACT

A link connector configured to connect a set of links together. The link connector has a body having an upper portion and a lower portion. A first blocking member is pivotably coupled to the upper portion of the body by a pin member. A second blocking member is pivotably coupled to the lower portion of the body by a pin member. The first and second blocking members are movable between an open position and a closed position such that when in the closed position the link connector forms an 8 shape.

18 Claims, 5 Drawing Sheets

(56) References Cited

U.S. PATENT DOCUMENTS

| | | | | |
|---|---|---|---|---|
| 2,357,478 | A * | 9/1944 | Koch | F16G 11/046 24/129 R |
| 3,461,666 | A * | 8/1969 | Burstall | B21K 1/72 59/35.1 |
| 6,336,260 | B1 * | 1/2002 | Mauthner | F16B 45/02 24/376 |
| 6,832,658 | B2 * | 12/2004 | Keast | E21B 3/02 166/77.52 |
| 6,920,926 | B2 * | 7/2005 | York | E21B 19/084 166/77.1 |
| 9,470,258 | B2 * | 10/2016 | Fitz-Earle | F16B 45/02 |
| 9,556,690 | B1 | 1/2017 | Marquez | |
| 2006/0162138 | A1 | 7/2006 | Kimura | |

OTHER PUBLICATIONS

International Search Report and Written Opinion dated Jun. 9, 2017, corresponding to Application No. PCT/US2017/016808.

* cited by examiner

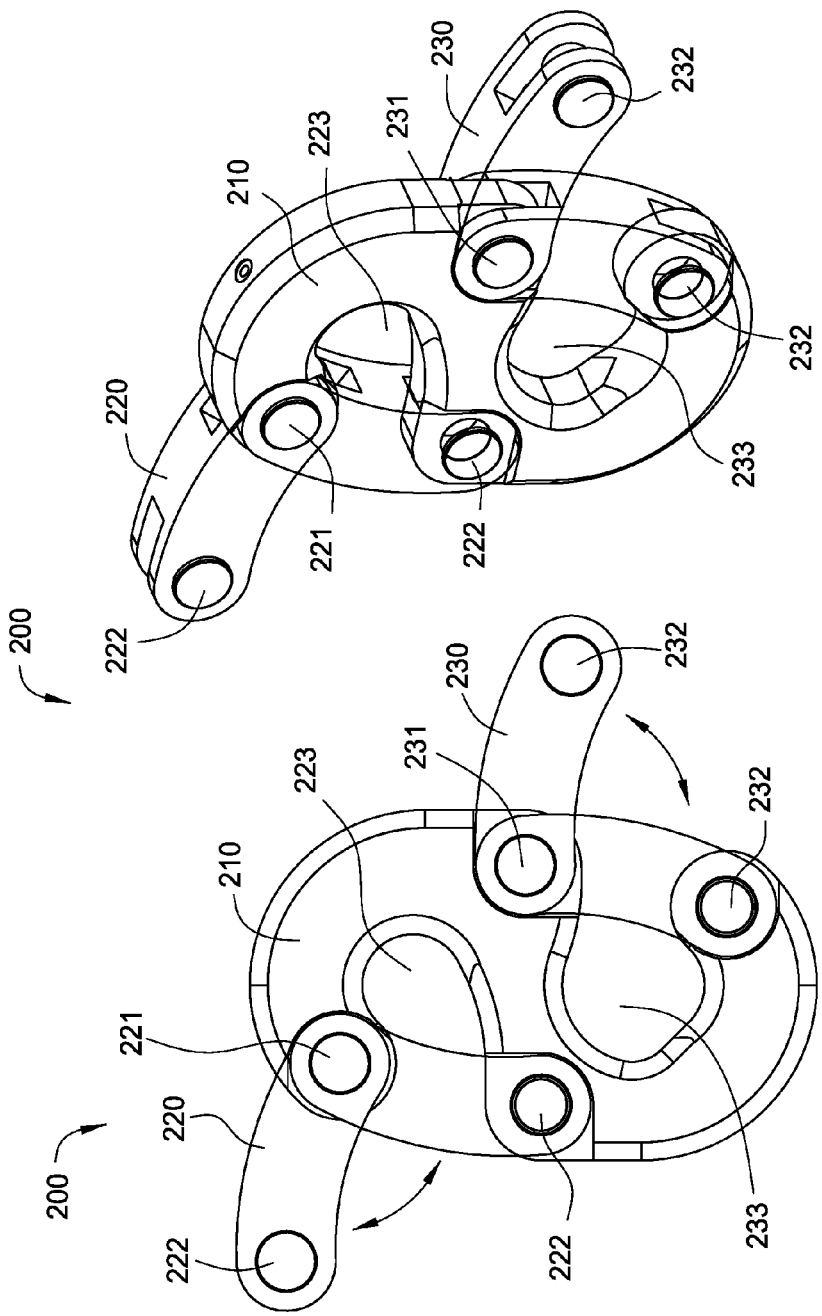

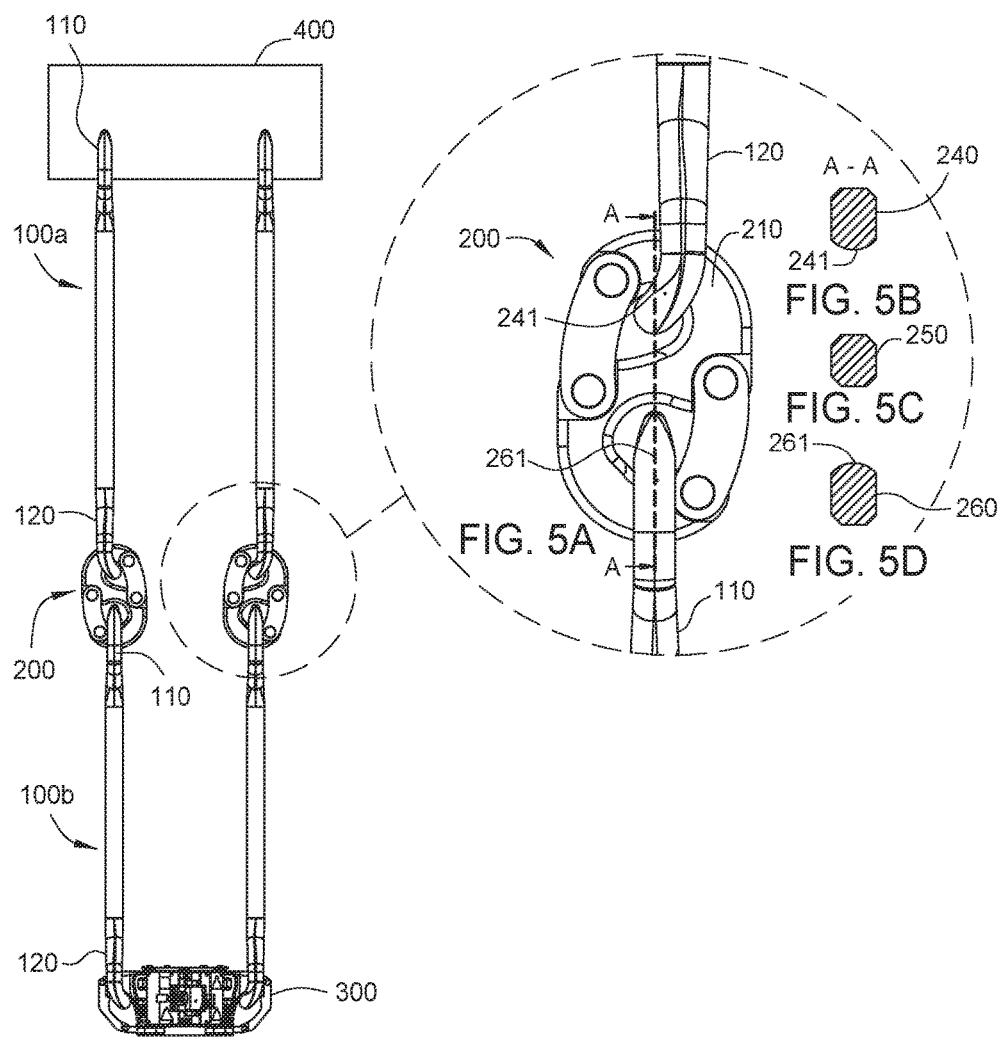

LINK CONNECTOR

CROSS-REFERENCE TO RELATED APPLICATION

This application claims benefit of U.S. Provisional Patent Application Ser. No. 62/314,559, filed on Mar. 29, 2016, which is herein incorporated by reference in its entirety.

BACKGROUND

Field

Embodiments of this disclosure relate to a link connector for connecting links together.

Description of the Related Art

Links are used to connect a variety of rig equipment together. For example, links are used to connect a top drive/traveling block with an elevator. The links are used in a set of two. Depending on the rig operation, the length or the size (or load rating) of the set of links that is needed often changes. Thus multiple sets of links of various lengths are required. The multiple sets of links, however, can take up a significant amount of space on a rig, which is very limited.

Therefore, there is a need for providing links that accommodate different length and/or size requirements while reducing the amount of space taken up on a rig.

SUMMARY

A link connector for connecting or adapting links together.

In one embodiment, a link connector configured to connect a set of links together comprises a body having an upper portion and a lower portion; a first blocking member pivotably coupled to the upper portion of the body by a pin member; and a second blocking member pivotably coupled to the lower portion of the body by a pin member, wherein the first and second blocking members are movable between an open position and a closed position, and wherein when in the closed position, the link connector forms an 8 shape.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A and 3B illustrate a link connector, according to one embodiment.

FIG. 4 illustrates an elevator connected to a top drive or traveling block by two sets of links that are connected together by link connectors, according to one embodiment.

FIGS. 5A-5D illustrate an enlarged view of one link connector of FIG. 4, and cross sectional portions of the link connector, according to one embodiment.

For clarity, identical reference numerals have been used, where applicable, to designate identical elements that are common between figures. Additionally, elements of one embodiment may be advantageously adapted for utilization in other embodiments described herein.

DETAILED DESCRIPTION

Figures 1A, 1B, 1C:
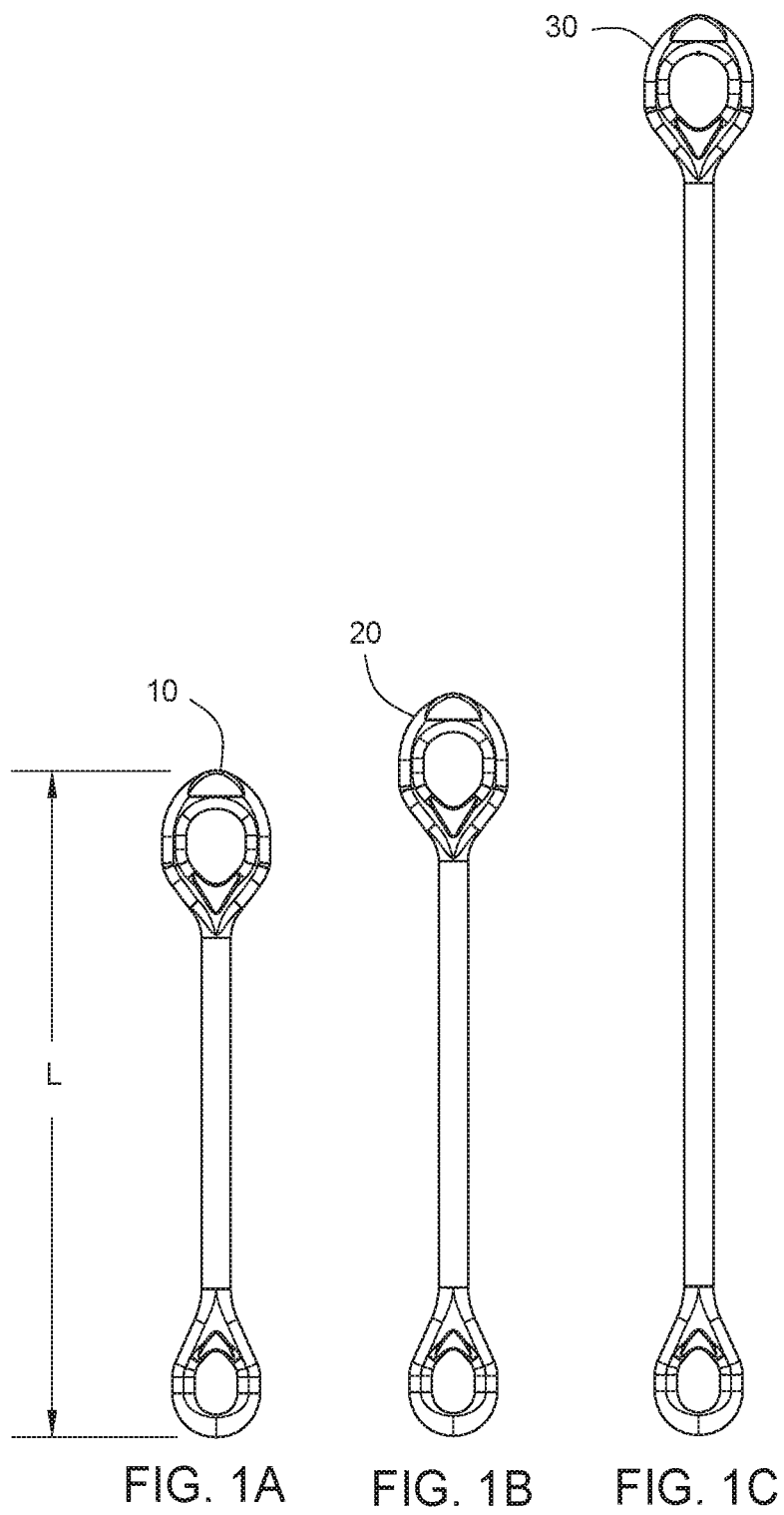
FIGS. 1A, 1B, and 1C illustrate three links of different lengths, according to one embodiment.

FIGS. 1A, 1B, and 1C illustrate three different links 10, 20, 30, each having a different length L, which may be used to connect a variety of rig equipment together. The links 10, 20, 30 are only exemplary as other lengths may be used with the embodiments described herein. Although only one link 10, 20, 30 of each length is shown and can be used with the embodiments described herein, the links 10, 20, 30 are generally used in a set of two links. Any combination or number of links 10, 20, 30 can be connected together using one or more link connectors 200 as further described below to form a desired length of links, which can reduce the total number of links that need to be stored on a rig and thereby reduce the amount of rig space taken up by the links.

Figure 2:
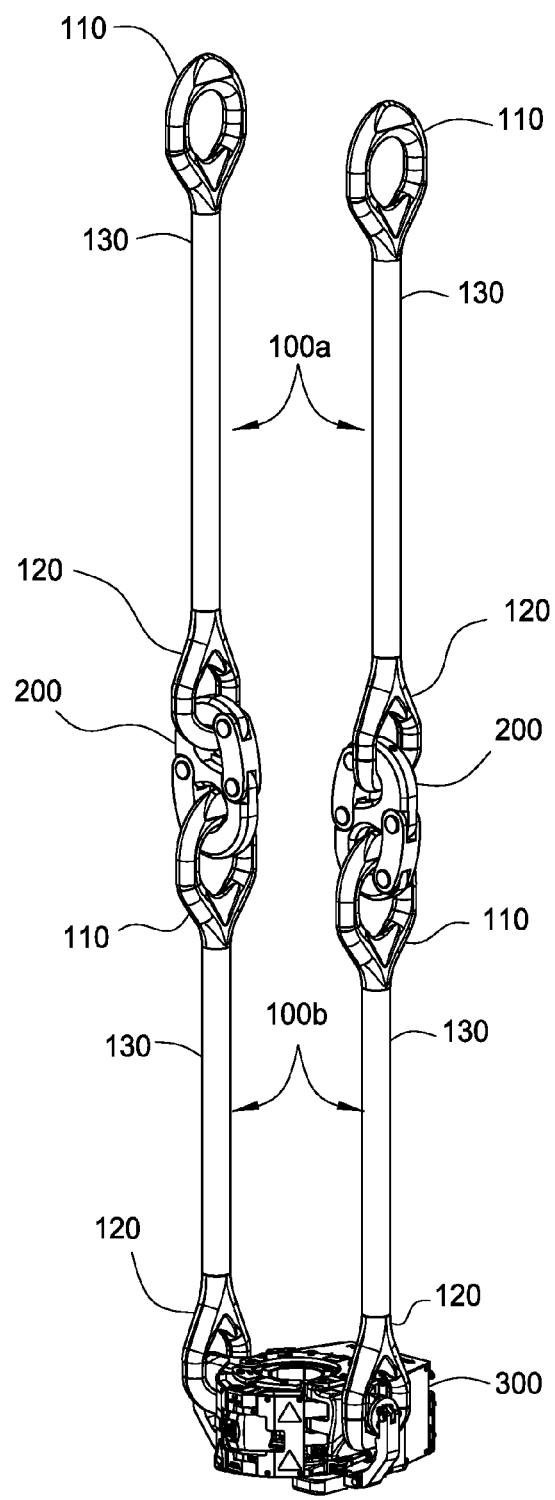
FIG. 2 illustrates two sets of links connected together by link connectors, and an elevator supported by the links, according to one embodiment.

FIG. 2 illustrates a first set of links 100a and a second set of links 100b connected together by two separate link connectors 200. Each link connector 200 connects two separate links together. The first and second set of links 100a, 100b are supporting an elevator 300. However, the first and second set of links 100a,100b can be used to support any other type of tubular handling device or rig equipment.

Referring to FIG. 2, each link of the first and second set of links 100a, 100b include an upper eyelet 110 disposed at one end of a body portion 130, and a lower eyelet 120 disposed at an opposite end of the body portion 130. The lower eyelets 120 of the first set of links 100a are coupled to the upper portion of the link connectors 200, while the upper eyelets 110 of the second set of links 100b are coupled to the lower portion of the link connectors 200. The lower eyelets 120 of the second set of links 100b are coupled to the elevator 300.

FIGS. 3A and 3B illustrate one link connector 200 in an open and closed position, according to one embodiment. The link connector 200 is configured to connect two separate links together. The link connector 200 has a body 210, a first blocking member 220, and a second blocking member 230. The body 210 is generally "S" shaped but may be formed in other shapes.

The first blocking member 220 is pivotably coupled at one end 221 to an upper portion of the body 210, such as by a pin member. In the open position, the second end 222 of the first blocking member 220 can be moved (e.g. rotated) away from and out of engagement with the body 210 to allow insertion or removal of an eyelet (such as the lower eyelets 120 of the first set of links 100a shown in FIG. 2) into or from an upper opening 223 of the link connector 200. In the closed position, the second end 222 of the first blocking member 220 can be moved (e.g. rotated) toward and into engagement with the body 210 to prevent and secure the eyelet from falling out of the upper opening 223 of the link connector 200.

The second blocking member 230 is pivotably coupled at one end 231 to a lower portion of the body 210, such as by a pin member. In the open position, the second end 232 of the second blocking member 230 can be moved (e.g. rotated) away from and out of engagement with the body 210 to allow insertion or removal of an eyelet (such as the upper eyelets 110 of the second set of links 100b shown in FIG. 2) into or from a lower opening 233 of the link connector 200. In the closed position, the second end 232 of the second blocking member 230 can be moved (e.g. rotated) toward and into engagement with the body 210 to prevent and secure the eyelet from falling out of the lower opening 233 of the link connector 200.

The first and/or second blocking members 220, 230 may be locked in either the open or closed position. The second end 222, 232 of the first and second blocking members 220, 230 may be secured to the body 210 in the closed position by a pin member disposed through corresponding openings formed in the blocking members 220, 230 and the body 210. When complete and assembled in the closed position, the link connector 200 generally has an "8" shape, which enables a heavy load capacity. The center of gravity of the link connector 200 may be in the middle of the "8" shape to enable a balanced and vertical hanging of links. The first and second blocking members 220, 230 may support and carry any load to enable the closed "8" shape link connector 200.

FIG. 4 illustrates the link connectors 200 in the closed position connecting the first and second set of links 100a, 100b together, which connect the elevator 300 to a tubular handling device 400, such as a top drive and/or a traveling block.

FIGS. 5A-5D illustrate an enlarged view of one link connector 200 of FIG. 4, and cross sectional portions 240, 250, 260 across section line A-A of the body 210 of the link connector 200, according to one embodiment. The cross sectional portion 260 is substantially the same as the cross section portion 240 but turned upside down. A lower surface 241 of the upper cross sectional portion 240 of the body 210 is rounded and/or has a certain radius depending on a desired load rating. The lower surface 241 is in contact with the lower eyelet 120. An upper surface 261 of the lower cross sectional portion 260 of the body 210 is rounded and/or has a certain radius depending on a desired load rating. The upper surface 261 is in contact with the upper eyelet 110. The middle cross sectional portion 250 of the body 210 may have substantially flat surfaces.

Figure 6:
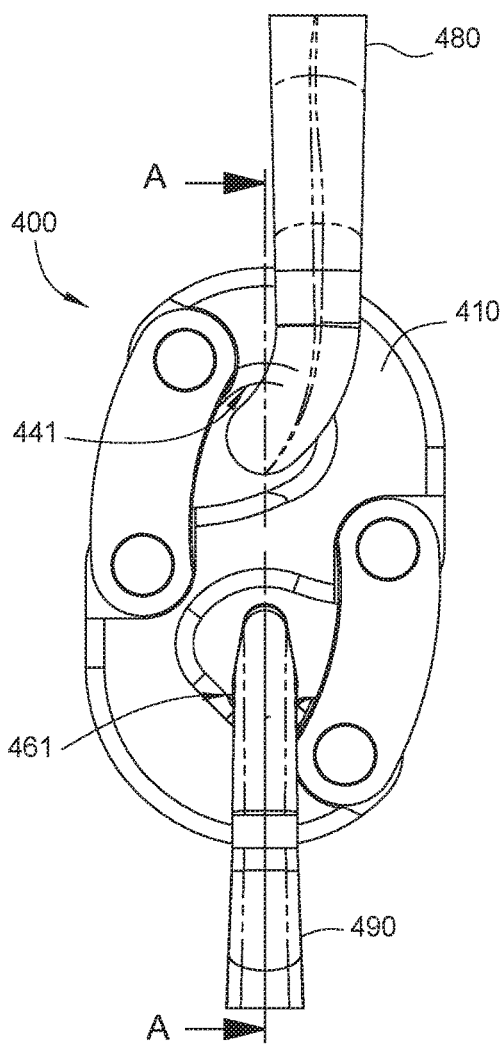
FIG. 6 illustrates an enlarged view of one link connector, according to one embodiment.
Figure 7A:
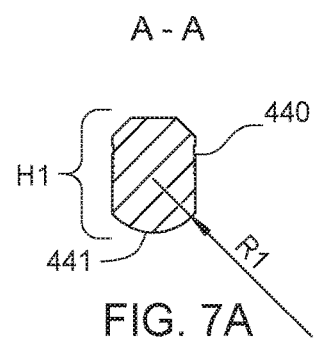
FIGS. 7A, 7B, and 7C illustrate cross sectional portions of the link connector of FIG. 6, according to one embodiment.
Figure 7B:
Figure 7C:
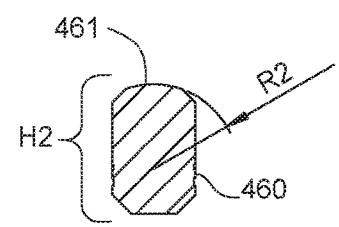

FIG. 6 illustrates an enlarged view of one link connector 400, and FIGS. 7A, 7B, and 7C illustrate cross sectional portions 440, 450, 460 across section line A-A of a body 410 of the link connector 400, according to one embodiment. The link connector 400 is similar to the link connector 200 with one difference being that the upper portion of the body 410 of the link connector 400 is configured to support one size (or load rating) of a link 480 at one end while the lower portion of the body 410 is configured to support a different size (or load rating) of another link 490 at the opposite end. The geometry of the body 410 is configured to allow the change over from one size (or load rating) of link to a different size (or load rating) of link while using the same link connector 400.

The profile of the upper cross sectional portion 440 of the body 410 has a height H1 and a lower surface 441 with a radius R1 configured to support a desired size (or load rating) of link, such as a 500 ton link. The profile of the lower cross sectional portion 460 of the body 410 has a height H2 and an upper surface 461 with a radius R2 configured to support a desired size (or load rating) of link, such as a 350 ton link. The lower surface 441 contacts the eyelet of the link 480 and the upper surface 461 contacts the eyelet of the link 490. The middle cross sectional portion 450 of the body 410 may have substantially flat upper and lower surfaces.

The height H1 and/or the radius R1 of the upper cross sectional portion 440 is different (e.g. larger or smaller) than the height H2 and/or the radius R2, respectively, of the lower cross sectional portion 460 so that the link connector 410 can support a link at one end that has a larger or smaller size (or load rating) than the link being supported at the opposite end. In this manner, only one pair of links and link connectors 410 would have to be added when it is desired to switch out links to a larger or smaller size (or load rating), compared to having to switch out both pairs of links. For example, in reference to FIG. 2, if the upper pair and lower pair of links 100a, 100b and the link connectors 200 are sized to support a 500 ton load for one rig operation, and then a subsequent rig operation only requires to support a 350 ton load, only the link connectors 200 and the lower pair of links 100b would need to be switched out with link connectors 410 and links 490 since the link connectors 410 are sized to connect to the upper pair of links 100a at the upper end and the different size links 490 at the lower end. This also reduces the number of pairs of links that need to be stored when space is limited.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

We claim:

1. A link connector system, comprising:
   a first link;
   a second link; and
   a link connector, comprising:
      a body having an upper portion and a lower portion;
      a first blocking member pivotably coupled to the upper portion of the body by a pin member, wherein an eyelet of the first link is secured to the upper portion of the body by the first blocking member; and
      a second blocking member pivotably coupled to the lower portion of the body by a pin member, wherein an eyelet of the second link is secured to the lower portion of the body by the second blocking member, wherein the first and second blocking members are movable away from the body into an open position to allow insertion or removal of the eyelets, and movable toward the body into a closed position to secure the eyelets, and wherein when in the closed position, the link connector forms an 8 shape.

2. The link connector system of claim 1, wherein a center of gravity of the link connector is located in a middle of the 8 shape.

3. The link connector system of claim 1, wherein the eyelet of the first link contacts a rounded surface of the upper portion of the body.

4. The link connector system of claim 1, wherein the eyelet of the second link contacts a rounded surface of the lower portion of the body.

5. The link connector system of claim 1, wherein the first link and the second link have the same length.

6. The link connector system of claim 1, wherein the first link and the second link have different lengths.

7. The link connector system of claim 1, wherein a cross section of the upper portion of the body is the same as a cross section of the lower portion of the body when taken across the same section line through the body.

8. The link connector system of claim 1, wherein the upper portion of the body is configured to support a link having a size that is different than a size of a link that is supported by the lower portion of the body.

9. The link connector system of claim 1, wherein the upper portion of the body is configured to support a link having a load rating that is different than a load rating of a link that is supported by the lower portion of the body.

10. The link connector system of claim 1, wherein an outer profile of a cross section of the upper portion of the body has a height that is different than a height of an outer profile of a cross section of the lower portion of the body when taken across the same section line through the body.

11. The link connector system of claim 1, wherein a lower surface of an outer profile of a cross section of the upper portion of the body has a radius that is different than a radius of an upper surface of an outer profile of a cross section of the lower portion of the body when taken across the same section line through the body.

12. A link connector system, comprising:
a first link;
a second link; and
a link connector, comprising:
   a body having an upper portion and a lower portion;
   a first blocking member pivotably coupled to the upper portion of the body by a pin member at a first end of the first blocking member, wherein an eyelet of the first link is secured to the upper portion of the body by the first blocking member;
   a second blocking member pivotably coupled to the lower portion of the body by a pin member at a first end of the second blocking member, wherein an eyelet of the second link is secured to the lower portion of the body by the second blocking member, wherein the first and second blocking members are movable away from the body into an open position to allow insertion or removal of the eyelets, and movable toward the body into a closed position to secure the eyelets; and
   wherein when in the closed position, the link connector forms an 8 shape, the first blocking member is secured to the body by a pin member at a second end of the first blocking member, and the second blocking member is secured to the body by a pin member at a second end of the second blocking member.

13. The link connector system of claim 12, wherein the pin member at the first end of the first blocking member, the pin member at the second end of the first blocking member, the pin member at the first end of the second blocking member, and the pin member at the second end of the second blocking member are disposed through a plurality of openings formed in the body and a corresponding plurality of openings formed in the first blocking member and the second blocking member.

14. The link connector system of claim 13, wherein a cross section of the upper portion of the body is the same as a cross section of the lower portion of the body when taken across the same section line through the body.

15. The link connector system of claim 13, wherein the upper portion of the body is configured to support a link having a size that is different than a size of a link that is supported by the lower portion of the body.

16. The link connector system of claim 13, wherein the upper portion of the body is configured to support a link having a load rating that is different than a load rating of a link that is supported by the lower portion of the body.

17. The link connector system of claim 13, wherein an outer profile of a cross section of the upper portion of the body has a height that is different than a height of an outer profile of a cross section of the lower portion of the body when taken across the same section line through the body.

18. The link connector system of claim 13, wherein a lower surface of an outer profile of a cross section of the upper portion of the body has a radius that is different than a radius of an upper surface of an outer profile of a cross section of the lower portion of the body when taken across the same section line through the body.

* * * * *